United States Patent

[11] 3,602,274

[72] Inventor Frederick R. Barrett
Peterborough, Ontario, Canada
[21] Appl. No. 826,172
[22] Filed May 20, 1969
[45] Patented Aug. 31, 1971
[73] Assignee Outboard Marine Corporation
Waukegan, Ill.

[54] ROLLER NOSE FOR CHAIN SAW CUTTER BAR
4 Claims, 5 Drawing Figs.
[52] U.S. Cl. ................................................. 143/32 H
[51] Int. Cl. ............................................... B27b 17/04
[50] Field of Search ............................................ 143/32

[56] References Cited
UNITED STATES PATENTS
3,198,223 8/1965 Bowen .......................... 143/32
3,263,715 8/1966 Dobbertin .................... 143/32

*Primary Examiner*—Donald R. Schran
*Attorneys*—Robert K. Gerling, Robert E. Clemency, John W. Michael, Andrew O. Riteris, Gerritt D. Foster, Bayard H. Michael, Paul R. Puerner, Joseph A. Gemigrani and Spencer B. Michael ABSTRACT: Disclosed herein is a nose roller for the cutter bar of a chain saw. The nose roller is an assembly of two annular or washer-shaped sideplates, a mounting tongue, a plurality of roller bearings, and an annular fastening member. The fastening member has two out-turned deformable lips or flanges which are pressed over the sideplates to assemble the nose roller components. The fastening member also has a radial extension with a peripheral surface which forms the inner race for the roller bearings. The outer race for the bearings is in an interior annular wall surface in an aperture in the mounting tongue.

PATENTED AUG 31 1971
3,602,274
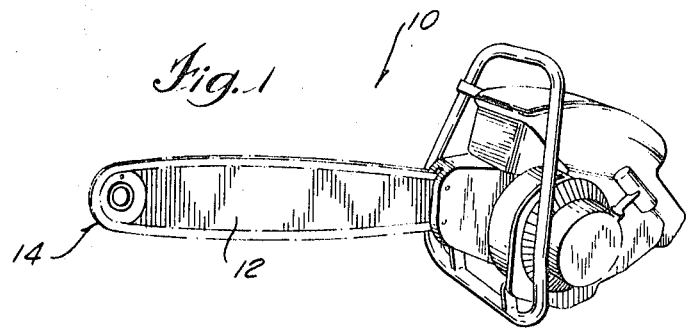
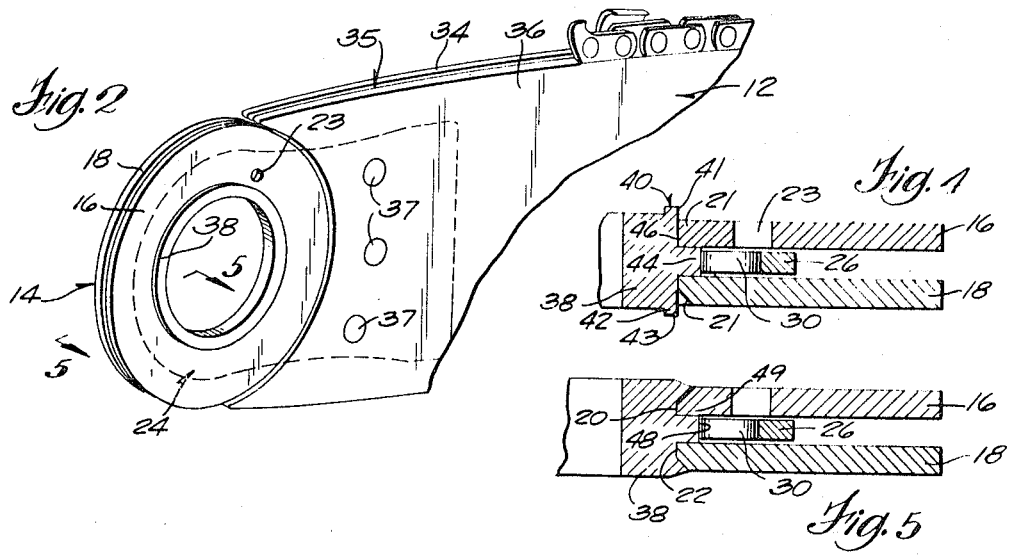
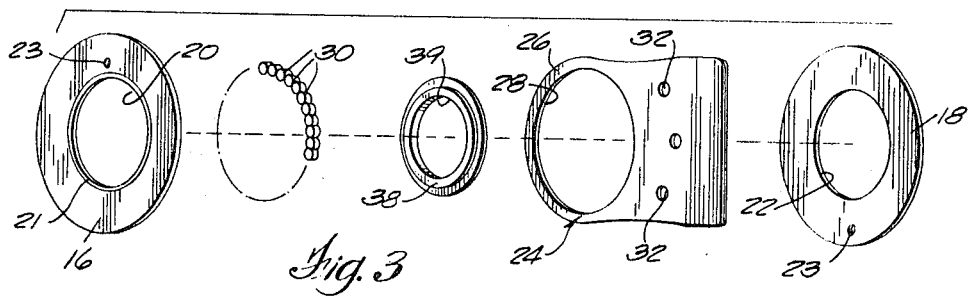
Inventor
Frederick G. Barrett
By
Wheeler, Wheeler, House & Clemency
Attorneys

ROLLER NOSE FOR CHAIN SAW CUTTER BAR

BACKGROUND OF THE INVENTION

The invention relates to the art of chain saws and more particularly to devices to minimize the frictional losses which occur as the cutting chain traverses the tip of the cutter bar during the operation of the saw. U.S. Pat. Nos. 3,198,222 and 3,198,223 show prior nose roller constructions.

SUMMARY OF THE INVENTION

The invention provides a nose roller for the forward end of a chain saw cutter bar. The nose roller comprises an assembly of sideplates, a fastening member, a plurality of roller bearings and a mounting tongue. The fastening member secures the sideplates together and spaces the sideplates to receive the drive tangs of the cutting chain. The fastening member also has a surface which serves as an inner race for the roller bearings. The fastening member also serves to mount the sideplates to the mounting tongue to form a unified assembly.

More specifically, the fastening member comprises an annular ring-shaped member having two out-turned shoulders which have deformable flange portions adapted to be pressed over the nose roller sideplates to secure them together in spaced relationship. An annular radially extending flange on the fastening member extends between and spaces the nose roller sideplates. The outer peripheral surface of the radially extending flange serves as an inner race for the roller bearings. The outer race for the bearings is formed by an internal annular wall portion of the mounting tongue, a portion of which is sandwiched between the sideplates of the cutter bar itself when the nose roller is mounted on the chain saw cutter bar. A hole in the sideplates facilitates direct lubrication of the bearings.

It is an object of the invention to provide a lightweight nose roller with an improved durability at a reduced cost.

It is a further object of the invention to provide a nose roller in which the functions of fastener, sideplate spacer, and inner bearing race are performed by a single member.

It is an additional object of the invention to provide a fastening member for uniting the components of a chain saw nose roller in a unified assembly for connection with the chain saw cutter bar.

It is an additional object of the invention to provide an arrangement for fastening nose roller sideplates to give an evenly distributed clamping force and thus minimize sideplate distortion.

It is a further object of the invention to provide an inner race for the bearings in a chain saw bar nose roller which has a greater contact area with the sideplates to increase heat dissipation and prolong bearing life.

It is an additional object of the invention to provide a nose roller in which the sideplates are provided with large apertures to receive the deformable flanges of an annular fastening member, which apertures facilitate heat treatment of the sideplates, and grinding of the outside diameter to make the outer edges of the sideplates concentric with the apertures.

Further objects and advantages of the present invention will become apparent from the following disclosure.

DESCRIPTION OF THE DRAWINGS

FIG. 1 is a perspective view of a chain saw embodying the nose roller of the invention.

FIG. 2 is an enlarged fragmentary perspective view of the nose roller and a portion of the chain saw cutter bar shown in FIG. 1.

FIG. 3 is an exploded perspective view of the nose roller shown in FIGS. 1 and 2.

FIG. 4 is an enlarged fragmentary sectional view of the nose roller shown in FIG. 3.

FIG. 5 is an enlarged fragmentary sectional view of the nose roller shown in FIG. 3 when it is assembled.

DETAILED DESCRIPTION

In the drawings, FIG. 1 discloses a portable chain saw which is generally designated 10 and which includes a cutter bar 12. The forward end of the cutter bar 12 is provided with a nose roller which is generally designated 14. In accordance with the invention, the nose roller 14 includes a pair of annular nose roller sideplates 16 and 18 which are each provided with relatively large diameter accurately dimensioned concentric apertures 20 and 22, respectively. The inner margins 21 of the sideplates 16 and 18 can be chamfered or beveled as shown in FIGS. 4 and 5 for purposes hereinafter described. The use of apertures of this size facilitates heat treatment. The sideplates 16 and 18 can also be provided with apertures 23 to afford direct lubrication of the bearings.

The nose roller 14 also includes a mounting tongue 24 which has an annular wall portion 26 with an annular internal surface 28 which forms the outer race for a plurality of roller bearings 30. The tongue 24 also includes mounting apertures 32 to facilitate assembly of the tongue between the sideplates 34 and 36 of the chain saw cutter bar 12. In this regard, the tongue 24 extends into a recess 35 between the sideplates 34 and 36 and is secured by rivets, or bolts 37 which extend through apertures 32 in the tongue.

In accordance with the invention, means are provided for securing the nose roller sideplates 16 and 18 together in spaced relation on opposed sides of the mounting tongue 24 to form a gap between the sideplates to receive the drive members of the cutting chain and to provide a surface which defines an inner race for the bearings 30. In the disclosed construction, the means for clamping the sideplates 16 and 18 to the tongue comprises an annular member 38 which has an aperture 39 and two outwardly or axially extending shoulders 40 and 42 with deformable shoulders or flange portions 41, 43. The aperture 39 lessens the overall weight of the nose roller and can be filled with a lightweight disc or plug (not shown). When the nose roller is assembled as hereinafter described, the flange portions 41, 43 are crimped or riveted over the sideplates 16, 18 to form a unified structure. The chamfered margins 19 receive the deformable flanges to provide a relatively smooth surface on the sideplates 16, 18. The member 38 also includes a radial annular extension 44 which projects from the surface 46 of member 38. The extension 44 has an axial length or thickness between side surfaces 49 slightly greater than the thickness of the tongue 24. The extension 44 also has a cylindrical concentric peripheral surface 48 which defines an inner race for the bearings 30. The radius of curvature of surface 48 is less than that of apertures 20 and 22 when the nose roller 14 is assembled.

When assembling the nose roller 14, the member 38 is inserted in the aperture in one of the sideplates 20 or 22 and within the internal wall portion 28 in the tongue. The roller bearings are circumferentially arranged between the inner race and the outer race formed by surface 48. The outer sideplate is then placed over the member 38 and the flanges 40 and 42 are crimped over the chamfered margins 19 of apertures 20 and 22 as shown in FIG. 5.

The nose roller of the invention eliminates the need for a plurality of rivets which are conventionally used to assemble chain saw nose rollers, minimizes the number of nose roller components and provides a durable nose roller with a fastening arrangement which decreases distortion of the sideplates. The large contact area between the side surfaces 49, the surface 46 and the deformable portions 40 and 42 with the sideplates 16 and 18 provides effective heat dissipation from the roller bearings 30 to increase the life of the bearings 30. The lubrication holes 23 afford direct lubrication of the bearings 30.

Various of the features of the invention are set forth in the following claims.

I claim:

1. A nose roller for the cutter bar of a chain saw, said nose roller comprising a pair of circular nose roller sideplates each having therein an aperture, a bearing, a mounting tongue having a wall portion with an annular internal surface which defines an outer race for said bearing and means adapted for connection to the cutter bar, and a ring member located between said sideplates and within said annular internal surface of said mounting tongue, said member having two extending flange portions received in said apertures and secured to said sideplates so as to locate said sideplates in spaced relation on opposed sides of said mounting tongue with a gap between said sideplates to receive the drive members of a cutting chain and so as to prevent disassembly of said sideplates from said tongue, said member also having a surface defining an inner race supporting said bearing in engagement with said annular internal surface of said tongue so as to afford rotation of said sideplates relative to said tongue.

2. A nose roller in accordance with claim 1, wherein said ring member also has a radial annular extension which projects from said flange portions, said extension having an axial thickness greater than the thickness of said tongue and a cylindrical peripheral surface which defines an inner race for said bearing.

3. A nose roller in accordance with claim 2 wherein said flange portions are deformable and said apertures in said sideplates have chamfered margins which receive said deformable flange portions.

4. A chain saw comprising a pair of circular nose roller sideplates, each of said sideplates having an aperture, a bearing, a mounting tongue having a wall portion with an annular internal surface supporting said bearing, and a ring member located within said annular internal surface of said mounting tongue and including portions received in said sideplate apertures and secured to said sideplates so as to locate said sideplates in spaced relation on opposed sides of said mounting tongue to form a gap between said sideplates to receive the drive members of a cutting chain and for preventing disassembly of said sideplates from said tongue, said member also having a surface supporting said bearing in engagement with said annular internal surface of said tongue whereby to afford rotary movement of the assembly of said ring member and sideplates relative to said mounting tongue, a cutter bar including at the forward end thereof a recess receiving said mounting tongue, and means for securing said mounting tongue to said cutter bar.